(12) United States Patent
Batchelder et al.

(10) Patent No.: US 10,888,908 B2
(45) Date of Patent: Jan. 12, 2021

(54) MAGNETICALLY THROTTLED LIQUEFIER ASSEMBLY

(71) Applicant: Stratasys, Inc., Eden Prairie, MN (US)

(72) Inventors: J. Samuel Batchelder, Somers, NY (US); Robert L. Zinniel, Plymouth, MN (US)

(73) Assignee: Stratasys, Inc., Eden Prairie, MN (US)

( * ) Notice: Subject to any disclaimer, the term of this patent is extended or adjusted under 35 U.S.C. 154(b) by 157 days.

(21) Appl. No.: 16/132,614

(22) Filed: Sep. 17, 2018

(65) Prior Publication Data

US 2019/0015884 A1    Jan. 17, 2019

Related U.S. Application Data

(63) Continuation of application No. 14/739,877, filed on Jun. 15, 2015, now abandoned.

(51) Int. Cl.
| | | |
|---|---|---|
| *B33Y 10/00* | (2015.01) | |
| *B21C 23/00* | (2006.01) | |
| *B33Y 30/00* | (2015.01) | |
| *B22F 3/00* | (2006.01) | |
| *B33Y 70/00* | (2020.01) | |
| *B22F 3/115* | (2006.01) | |
| *C22C 21/00* | (2006.01) | |

(52) U.S. Cl.
CPC .............. *B21C 23/00* (2013.01); *B22F 3/008* (2013.01); *B22F 3/115* (2013.01); *B33Y 30/00* (2014.12); *B33Y 70/00* (2014.12); *C22C 21/00* (2013.01); *B22F 2999/00* (2013.01); *B33Y 10/00* (2014.12)

(58) Field of Classification Search
CPC ................................ B33Y 10/00; B33Y 30/00
See application file for complete search history.

(56) References Cited

U.S. PATENT DOCUMENTS

| | | |
|---|---|---|
| 556,472 A | 3/1896 | McCarroll |
| 1,533,309 A | 4/1925 | Durborow |
| 2,207,405 A | 7/1940 | Jacobson |
| 4,749,347 A | 6/1988 | Valavaara |
| 5,109,589 A | 5/1992 | Cramer et al. |

(Continued)

FOREIGN PATENT DOCUMENTS

| | | |
|---|---|---|
| WO | 1999/037454 B1 | 7/1999 |
| WO | 1999/037456 B2 | 7/1999 |
| WO | 2000/078519 B3 | 12/2000 |

OTHER PUBLICATIONS

Finke, S.; Feenstra, F. K.: "Solid Freeform Fabrication by Extrusion and Deposition of Semi-Solid Alloys". Journal of Materials Science, Kluwer Academic Publishers, BO. vol. 37, No. 15, Aug. 1, 2002, pp. 3101-3106.

(Continued)

*Primary Examiner* — Scott R Kastler
(74) *Attorney, Agent, or Firm* — Westman, Champlin & Koehler, P.A.

(57) ABSTRACT

A magnetically throttled liquefier assembly for use in an additive manufacturing system and configured to heat a metal-based alloy to an extrudable state includes an array of magnets to generate a magnetic field in order to induce a viscosity in the heated metal-based alloy and to control the flow rate of the heated metal-based alloy through the liquefier for extrusion and the building of a three-dimensional object with the metal-based alloy.

17 Claims, 5 Drawing Sheets

(56) References Cited

U.S. PATENT DOCUMENTS

| | | |
|---|---|---|
| 5,121,329 A | 6/1992 | Crump |
| 5,141,680 A | 8/1992 | Almquist et al. |
| 5,167,138 A | 12/1992 | Sinha et al. |
| 5,303,141 A | 4/1994 | Batchelder et al. |
| 5,312,224 A | 5/1994 | Batchelder et al. |
| 5,340,433 A | 8/1994 | Crump et al. |
| 5,342,664 A | 8/1994 | Drotloff et al. |
| 5,406,969 A | 4/1995 | Gray et al. |
| 5,503,785 A | 4/1996 | Crump et al. |
| 5,572,431 A | 11/1996 | Brown et al. |
| 5,622,216 A | 4/1997 | Brown |
| 5,656,230 A | 8/1997 | Khoshevis |
| 5,764,521 A | 6/1998 | Batchelder et al. |
| 5,782,120 A | 7/1998 | Wright |
| 5,816,466 A | 10/1998 | Seufer |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,027,326 A | 2/2000 | Cesarano, III et al. |
| 6,054,077 A | 4/2000 | Comb et al. |
| 6,067,480 A | 5/2000 | Stuffle et al. |
| 6,085,957 A | 7/2000 | Zinniel et al. |
| 6,202,734 B1 * | 3/2001 | Sackinger ............ B22F 3/115 164/271 |
| 6,214,279 B1 | 4/2001 | Yang et al. |
| 6,238,613 B1 | 5/2001 | Batchelder et al. |
| 6,257,517 B1 | 7/2001 | Babish et al. |
| 6,360,576 B1 | 3/2002 | Plata et al. |
| 6,547,995 B1 | 4/2003 | Comb |
| 6,578,596 B1 | 6/2003 | Batchelder et al. |
| 6,637,250 B2 | 10/2003 | Plata et al. |
| 6,722,872 B1 | 4/2004 | Swanson et al. |
| 6,814,907 B1 | 11/2004 | Comb et al. |
| 7,026,574 B2 | 4/2006 | Belfiore et al. |
| 7,168,935 B1 | 1/2007 | Taminger et al. |
| 7,942,987 B2 | 5/2011 | Crump et al. |
| 7,977,599 B2 | 7/2011 | Adams |
| 8,215,371 B2 | 7/2012 | Batchelder |
| 8,245,757 B2 | 8/2012 | Crump et al. |
| 2004/0188053 A1 | 9/2004 | Brice |
| 2006/0045787 A1 | 3/2006 | Jandeska, Jr. et al. |
| 2007/0003656 A1 | 1/2007 | LaBossiere et al. |
| 2007/0228590 A1 | 10/2007 | LaBossiere et al. |
| 2009/0314391 A1 | 12/2009 | Crump et al. |
| 2010/0071883 A1 | 3/2010 | Vetrovec |
| 2016/0136887 A1 | 5/2016 | Guillemette et al. |

OTHER PUBLICATIONS

Cao, W.; Miyamoto, Y.: Freeform Fabrication of Aluminum Parts by Direct Deposition of Molten Aluminum. Journal of Materials Processing Technology, Elsevier, NL, vol. 173, No. 2, Apr. 10, 2006, pp. 209-212.

International Search Report and Written Opinion for corresponding International Application No. PCT/US2009/047736, filedJun. 18, 2009.

AMS International, "Introduction to Aluminum-Silicon Casting Alloys," (10 pages), vol. 1; Aluminum-Silicone Casting Alloys: Atlas of Microfractographs; Materials Park, Ohio, USA. 2004.

Zhang, B., Zhao, D.Q., Pan M.X., Wang, W.H. Greer, A.L., "Amorphous Metallic Plastic", Physical Review Letters, published May 23, 2005, (4 pages) PRL 94, 205502 (2005), The American Physical Society College Park, MD, USA.

Murthy, N.S., Minor H., Akkapeddi, M.K., Van Buskirk, B., "Characterization of Polymer Blends and Alloys be Constrained Profile-Analysis of X-Ray Diffraction Scans", accepted Jan. 2, 1990, (8 pages), Journal of Applied Polymer Science, vol. 41, 2265-2272 (1990), John Wiley & Sons, Inc., USA.

Prosecution History from corresponding U.S. Appl. No. 14/739,877, filed Jun. 15, 2015 including: Advisory Action dated Jul. 12, 2018; Final Rejection dated Apr. 19, 2018; Non-Final Rejection dated Sep. 12, 2017; and Restriction Requirement dated May 26, 2017.

\* cited by examiner

MAGNETICALLY THROTTLED LIQUEFIER ASSEMBLY

CROSS-REFERENCE TO RELATED APPLICATION

This Application is a Continuation Application of U.S. application Ser. No. 14/739,877, filed Jun. 15, 2015, the contents of which are hereby incorporated by reference in their entirety.

BACKGROUND

The present disclosure relates to additive manufacturing systems for building three-dimensional (3D) parts with layer-based, additive manufacturing techniques. In particular, the present disclosure relates to extrusion-based additive manufacturing systems for building 3D objects with metal-based alloys.

An extrusion-based additive manufacturing system (e.g., fused deposition modeling systems developed by Stratasys, Inc., Eden Prairie, Minn.) is used to build a 3D object from a computer-aided design (CAD) model in a layer-by-layer manner by extruding a flowable modeling material. The modeling material is extruded through an extrusion tip carried by an extrusion head, and is deposited as a sequence of roads on a substrate. The extruded modeling material fuses to previously deposited modeling material, and solidifies upon a drop in temperature. The position of the extrusion head relative to the substrate is incremented to deposit a next layer of material, and the process is then repeated to form a 3D object resembling the CAD model.

Movement of the extrusion head with respect to the substrate is performed under computer control, in accordance with build data that represents the 3D object. The build data is obtained from software that initially slices the CAD model of the 3D object into multiple sliced layers, and generates tool paths for depositing roads of material within each layer. Typically, the CAD model is sliced by an off-board computer, and tool paths instructions are transmitted to the additive manufacturing system to define the build data for printing of the 3D object.

In fabricating 3D objects by depositing layers of modeling material, supporting layers or structures are typically built underneath overhanging portions or in cavities of objects under construction, which are not supported by the modeling material itself. A support structure may be built utilizing the same techniques used to print the 3D object. Additional geometry is generated to create a support structure for the overhanging or free-space segments of the 3D object being formed. The support structure is built up layer-by-layer in coordination with printing of the 3D model, and may be built from a support material which is deposited from a second extrusion, the support structure adheres to the model during fabrication, and is removable from the completed 3D object when the build process is complete.

A common interest of consumers in the industry of additive manufacturing is to increase the physical properties of the 3D objects, such as part strengths and durability. One category of materials that could provide such increased physical properties include metal-based alloys. For example, 3D objects built from high-strength metals may exhibit tensile strengths that are substantially greater than those of industrial thermoplastic materials. However, the extrusion of metal-based alloys poses several issues for additive manufacturing. For example, the extrusion of metal-based alloys requires high operating temperatures, which may undesirably affect performance of current digital manufacturing systems. Furthermore, heating a metal-based alloy to a temperature above its liquidus temperature may prevent the alloy from having a sufficient viscosity for extrusion, and may undesirably affect its grain structure upon re-solidification (e.g., dendrite formation). Thus, there is an ongoing need for systems and methods for build 3D objects from metal-based alloys with additive manufacturing techniques.

SUMMARY

An aspect of the present disclosure relates to a magnetically throttled liquefier for use in an additive manufacturing system. The magnetically throttled liquefier allows for controlled extrusion rates of a heated metal-based alloy to the same or similar degree with which other materials used in building 3D objects can be controlled (e.g. thermoplastic materials). The magnetically throttled liquefier is configured in one embodiment to induce an adjusted (e.g., increased) viscosity in a heated metal-based alloy to allow for flow control as liquidus metal-based alloy or freezing range metal-based alloy is deposited to build the 3D object.

The magnetically throttled liquefier comprises in one aspect a liquefier configured to heat a feedstock of metal-based alloy to a flowable state and a flow channel for receiving the heated metal-based alloy. The flow channel is positioned within the liquefier such that a flow path of the metal-based alloy is perpendicular to a magnetic field, or to a plurality of spaced apart and alternating or oscillating magnetic fields, generated by a magnet, or an array of magnets, that is, or are, also positioned within the liquefier. The magnetic field(s) are then directed orthogonal to a flow direction through the flow channel along the length thereof. Motion of the heated metal-based alloy through the channel orthogonal to the magnetic field(s) creates eddy currents in the metal-based alloy, allowing control of viscosity of the metal-based alloy.

In another aspect, the liquefier includes a current source to pass a current through the flow channel orthogonal to the flow direction and to the magnetic field(s) for even more control of the viscosity, allowing its use as a pump and a throttle for the heated metal-based alloy. In this embodiment, the interaction between the current, the magnetic field, and the moving metal-based alloy causes the induction of eddy currents in the heated metal-based alloy. As the heated metal-based alloy flows through the liquefier while subjected to an electric current and a magnetic field or fields, the induced eddy currents in the metal-based alloy allow adjustment of a viscosity in the metal-based alloy to make it suitable for controlled extrusion as a result of resistive forces generated in the flow channel by the magnetic field, the current, the induced eddy currents and the flow or velocity of the heated metal-based allow. The magnetic field created by the eddy currents resists relative motion of the heated metal-based alloy flowing in the channel and thus results in a magnetically throttled liquefier to effectively control the flow rate of the heated metal based-alloy through the flow channel and liquefier for extrusion.

Another aspect of the present disclosure is directed to a method for printing a 3D part with an additive manufacturing system. The method includes feeding a metal-based alloy stock (e.g., a filament), to a magnetically throttled liquefier retained by the additive manufacturing system with a drive mechanism retained by the additive manufacturing system, and melting the metal-based alloy stock in the liquefier to produce a liquidus or freezing range material. The method also includes providing the heated metal-based alloy to a flow channel and utilizing a magnetic field, or alternating or oscillating magnetic fields, and electrical current orthogonal to the magnetic field lines and the direction of flow of the material in the flow channel to induce a selected viscosity in the heated metal-based alloy for regulating a flow and extrusion of the metal-based alloy in a controlled manner such that a 3D object can be formed.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

The term "elevated temperature" as used herein with respect to a build chamber desirably in the range from the solidification temperature of the metal-based alloy to the creep relaxation temperature of the metal-based alloy. Examples of suitable elevated temperatures for the build chamber range from about 200° C. to about 800° C., with particularly suitable temperatures ranging from about 400° C. to about 700° C., and with even more particularly suitable temperatures ranging from about 500° C. to about 650° C.

The terms "throttled" and "throttle" as used herein refer to the control via magnetic/electrical forces of flow of a heated metal-based alloy within the embodiments of the disclosure, without using valves. A throttled flow may have its flow rate increased or decreased in a direction of flow when the metal-based alloy is extruded and may in certain circumstances reverse the direction of flow to evacuate an extrusion tip using the magnetic/electrical throttle.

DETAILED DESCRIPTION

The present disclosure is directed to a magnetically throttled liquefier assembly having a flow channel configured for inducing viscosity in a heated metal-based alloy for controlling the flow of the metal-based alloy for extrusion. The magnetically throttled liquefier may be configured for use in an additive manufacturing system, such as an extrusion-based additive manufacturing system. The liquefier assembly includes an extrusion line having a flow channel configured to induce a viscosity in a heated metal-based alloy that is suitable for extrusion and allows for flow control of the metal-based alloy through the liquefier to an extrusion tip. As discussed below, the liquefier comprises in one embodiment a flow channel that is configured to direct the flow of heated metal-based alloy through the channel in response to a magnetic field and an electrical current passed through the heated metal-based alloy in the flow channel to induce an increased viscosity such that the heated metal-based alloy may be extruded in a controlled manner.

Figure 1:
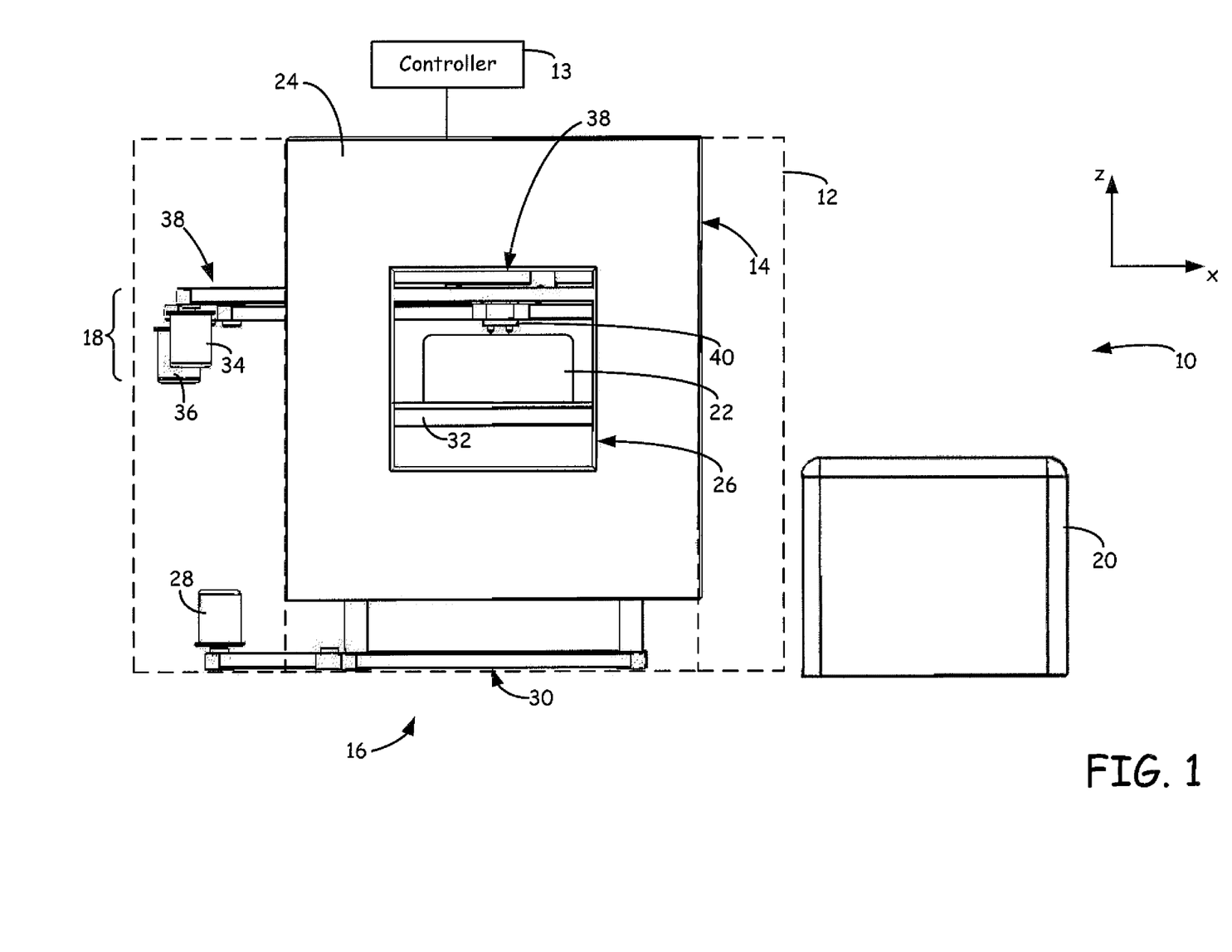
FIG. 1 is a front view of an additive manufacturing system for building 3D objects with metal-based alloys.

FIG. 1 is a front view of an embodiment of an additive manufacturing system 10, which is preferably a high-temperature, digital manufacturing system for building 3D objects with metal-based alloys. As illustrated, system 10 includes housing 12 (shown with broken lines), controller 13, build chamber 14, platform assembly 16, head assembly 18, and quench tank 20. Housing 12 is the exterior cover of system 10, which protects the internal components of system 10 from external conditions. System 10 may also include support frames (not shown) for retaining build chamber 14, platform assembly 16, and head assembly 18 within housing 12 at the respective locations shown in FIG. 1.

Build chamber 14 may be an enclosed, high-temperature environment in which 3D objects (represented as 3D object 22 in FIG. 1) are built with one or more metal-based alloys. Build chamber 14 desirably functions as a high-temperature oven, and is desirably maintained at one or more elevated temperatures to reduce the risk of mechanically distorting (e.g., curling) 3D object 22, and to decrease shrinkage due to the effects related to the coefficient of thermal expansion of the metal-based alloy. The temperature of build chamber 14 may be elevated through the use of electrical and/or flame-based mechanisms using, for example, timed thermal ramping cycles.

The system 10 comprises a platform assembly 16, which includes drive motor 28, z-axis gantry 30, and build platform 32 and head assembly 18 which includes drive motors 34 and 36, x-y-axis gantry 38, and extrusion head 40. Suitable examples of system 10 are described in Crump et al. U.S. Pat. No. 7,942,987, the disclosure of which is hereby incorporated by reference in its entirety.

During a build operation, build chamber 14 may be substantially purged of oxidizing gases (e.g., purging with argon and/or vacuum), and heated to one or more elevated temperatures. Controller 13 then directs drive motors 34 and 36 to move extrusion head 40 around within build chamber 14 in the horizontal X-Y plane via x-y-axis gantry 38. Controller 13 also directs extrusion head 40 to extrude the metal-based alloy onto build platform 32 in a pattern based on the movement of extrusion head 40, thereby forming a layer of 3D object 22.

When most metal-based alloys are heated to a temperature at or above their respective liquidus temperature, the metal-based alloys have a low viscosity, often lower than water. These heated metal-based alloys also possess a high surface tension in addition to a tendency to re-melt a surface on which the heated metal-based alloy is applied. The properties of heated metal-based alloys have made building 3D objects with extrusion-based digital manufacturing systems difficult to control.

Prior art approaches to controlling the flow of heated metal-based alloys for extrusion and deposition have included raising the viscosity of the heated metal-based alloy by incorporating solid particles into the melt to increase the effective viscosity. Implementing a slush-phase (peritectic) metal-based alloy is an artificial means to increase the effective viscosity of alloys for extrusion based digital manufacturing, however this means can result in clogging of the extrusion line.

Advantageously, embodiments of the present disclosure are directed to increasing the viscosity of heated metal-based alloys for extrusion. The present disclosure is directed to an embodiment capable of increasing the viscosity of a liquidus metal-based alloy, with or without implementing a slush-phase, and without fully melting a previously extruded layer, while allowing the heated metal-based alloy to reliably flow through the extrusion line to an extrusion tip without clogging resulting from the crystal population of the slush phase. In some embodiments, the need for a filter or other mechanism to remove or prevent crystal population of the heated metal-based alloy may be eliminated.

Metal alloys, particularly aluminum alloys, have high electrical conductivity. The present disclosure uses the effect of passing a conductive element, the heated metal-based alloy, through a magnetic field which induces an increased viscosity in the heated metal-based alloy. By passing an induced electrical current through the moving conductive element a second magnetic field, an induced magnetic field, is generated. As the induced magnetic field is in such a direction as to oppose the motion or change that caused it, the induced magnetic field is oriented in a direction that opposes the flow direction of the heated metal-based alloy, allowing the magnetically throttled liquefier to induce a viscosity in the heated metal-based alloy and to control the flow of the heated metal-based alloy through the extrusion line. In an embodiment of the liquefier according to the present disclosure, the flow of the heated metal-based alloy through the liquefier can be effectively controlled by the magnetically throttled liquefier.

A modest magnetic field, for example, of one Tesla, passing through an extrusion tip pipe of a metal-based alloy extrusion system can be estimated to increase the effective viscosity of the heated metal-based alloy by roughly a factor of 3,000. The magnetically-induced viscosity can be high enough such that the viscosity outweighs effects from other forces present in the system, including surface tension, gravity, part back pressure, and inertia on the heated metal-based alloy. Thus, a magnetic field can be incorporated in one embodiment into the extrusion line to control the flow of the heated metal-based alloy. The magnetic field can be used in connection with a current flow through the metal-based alloy to effectively control the flow of the heated metal-based alloy through the liquefier orthogonal to the current and to the magnetic field. The flow of the heated metal-based alloy is then as controllable as that of other materials used in additive manufacturing systems, for example, amorphous plastics.

Figure 2:
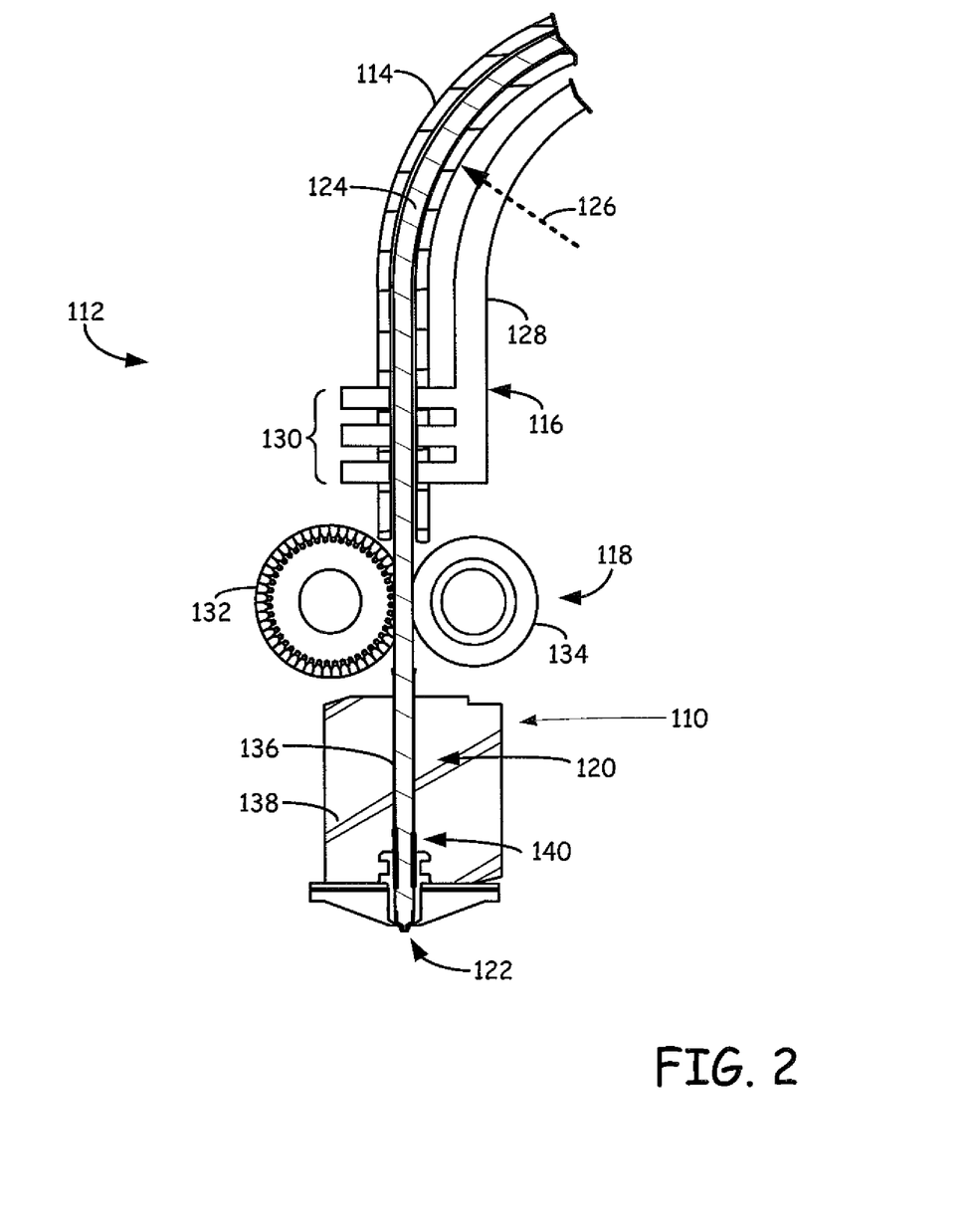
FIG. 2 is an expanded partial sectional view of an extrusion line of the extrusion head for extruding a metal-based alloy.

FIG. 2 illustrates an expanded partial sectional view of extrusion line 112 of extrusion head 40, also referred to as a print head, (illustrated in FIG. 1) for extruding, or printing, a metal-based alloy to build 3D object 22 (illustrated in FIG. 1). Extrusion line 112 includes feed tube 114, coolant assembly 116, drive mechanism 118, liquefier assembly 120, and extrusion tip 122. In one embodiment, feed tube 114 receives the metal-based alloy in a wire form (represented as wire 124) from a supply source of wire 124 located external to build chamber 14, where wire 124 is supplied to extrusion head 40 through an umbilical (not shown). The dimensions of wire 124 may vary depending on the metal-based alloy used, and on the dimensions and capabilities of feed tube 114, drive mechanism 118, and liquefier assembly 120. Examples of suitable average diameters for wire 124 range from about 0.508 millimeters (about 0.020 inches) to about 2.54 millimeters (about 0.100 inches). In embodiments in which wire 124 is substantially rigid due to its diameter, the radius of curvature of feed tube 114 (represented as radius 126) is desirably at least fifty times the diameter of wire 124 to reduce friction within feed tube 114.

The extrusion line 112 includes a liquefier assembly 120 having a liquefier tube 136 and liquefier block 138. In another embodiment, heater assemblies 158 are used to provide more control of temperature of the heated metal-based allow in the liquefier tube 136. The liquefier tube 136 is, in one embodiment, a thin-walled, thermally conductive tube extending through liquefier block 138, and has an entrance proximate drive mechanism 118, and an exit at extrusion tip 122.

Liquefier block 138 is a heating block for heating wire 124 to a temperature suitable for a desired flow pattern based on a thermal profile along liquefier block 138. Due to the high thermal conductivity of the metal-based alloy (relative to thermoplastic materials), the length of thermal profile along liquefier block 138 may be reduced, which correspondingly reduces the flow response time during the build operation. Extrusion tip 122 is secured to a distal end of liquefier assembly 120, and has a tip diameter for depositing roads of the metal-based alloy, where the road widths and heights are based in part on the tip diameter.

An extrudable state is reached by heating the metal-based alloy to an elevated temperature, the elevated temperature being at least between a solidus state and a liquidus state of the metal-based alloy. At least a portion of the heated metal-based alloy may be heated to an elevated temperature at or above a liquidus state of the metal based alloy. The liquefier 120 is configured to heat the metal-based alloy to an extrudable state and is further configured to induce a viscosity suitable for controlled extrusion in the heated metal-based alloy.

Heating the wire 124 may be performed in a number of different ways without departing from the scope of the disclosure. For example, in addition to the heating methods and apparatus discussed herein, magnetic induction may be used as a heat source for converting a wire input to liquid. In one embodiment, a magnetic induction heater may be used in the extrusion head 40 without departing from the scope of the disclosure.

Extrusion line 112 utilizes magnetohydrodynamic drive to control the flow of the heated metal-based alloy. As illustrated in further detail in FIGS. 3-4, liquefier tube 136 comprises channel 140 having an entrance along a length of liquefier tube 136 above extrusion tip 122 and an exit near extrusion tip 122, which provides a flow channel for heated metal-based alloy in a first direction, for example the z-direction. An array of magnets 142 is positioned in liquefier block 138 and extending along a length of liquefier tube 136 at least to the extent of the length of channel 140. The array of magnets 142 comprises one or more magnets, which for example, may be permanent magnets such as neodymium magnets able to withstand elevated temperatures in liquefier block 138. The array of magnets produces oscillating or alternating magnetic fields oriented in a second direction, the x-direction as illustrated by arrows 143. Thus, each of the magnetic field lines is substantially perpendicular to flow channel 140 and to the direction of flow of the heated metal-based alloy in flow channel 140. The movement of the heated metal-based alloy through the channel and orthogonal to the magnetic field induces eddy currents in the alloy. These eddy currents create a magnetic field that opposes the magnetic field through which the heated metal-based alloy passes, increasing its viscosity, and therefore reducing the flow rate. This allows for throttling of the flow.

Figure 3:
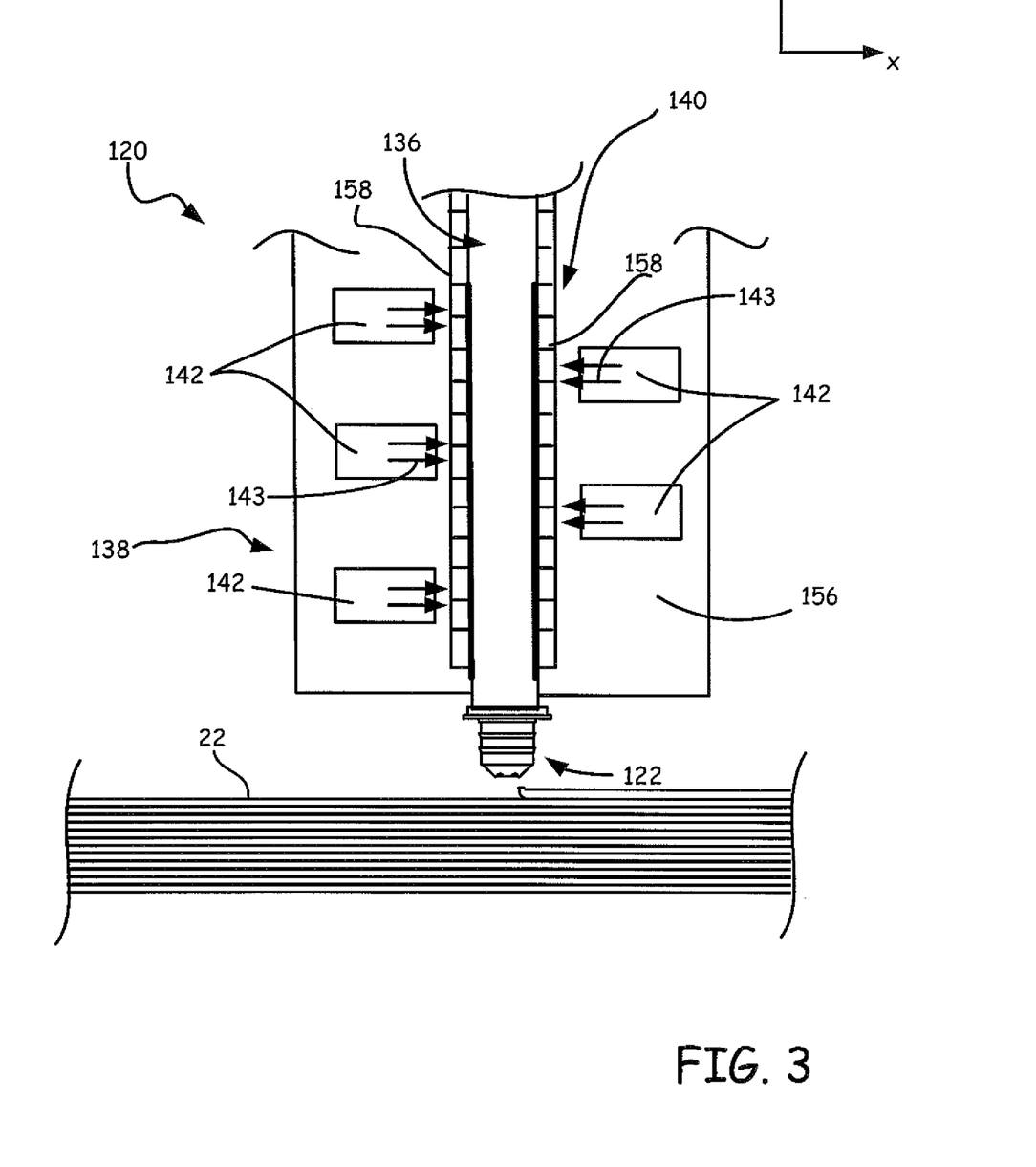
FIG. 3 is a further expanded partial sectional view of the extrusion line having a magnetic throttle.

In such a magnetohydrodynamic drive, the pump configuration may be used to generate a small backward flow of heated metal-based alloy, such as, for example, a roll-back to evacuate the extrusion tip 122. While discussed as a throttle, it should be understood that the embodiments of the present disclosure may be used as a stand-alone pump as well, such as in pumping sodium-potassium alloys (NaK) in nuclear breeder reactors, for example.

While FIG. 3 shows magnets 142 on alternating sides of the liquefier tube 136, it should be understood that placement of magnets may be varied while still retaining alternating magnetic fields, without departing from the scope of the disclosure. Further, magnets may be permanent magnets, or may be electromagnets or other magnetic field producing elements, also without departing from the scope of the disclosure.

Channel 140 may be further configured with a current source 144 to provide a current along the y-direction orthogonal to flow channel 140 and to magnetic field lines, and to pass current through flow channel 140 to the heated metal-based alloy in channel 140. Current source 144 may in one embodiment comprise terminals (e.g., electrodes) positioned in contact with an outer surface of channel 140 such that the electrodes are configured to pass current into channel 140. Alternatively, electrodes 144 may actually be formed within channel 140. Forming electrodes 144 directly in channel 140 may eliminate the need for electrical contacts between electrodes 144 and a source of current when multiple magnets 142 are positioned with alternating poles along channel 140 and where channel 140 is configured for annular flow. The current and magnetic fields combined with eddy currents created in the alloy form an electromagnetic pump with controllable extrusion of the heated metal-based alloy, as is described further herein. The pump may be used to throttle flow as well as to increase flow in the flow channel. Current source 144 in one embodiment may be an annular current that creates a variable magnetic field depending on the magnitude of the current, allowing further control of the eddy currents generated in the heated metal-based alloy.

Figure 4:
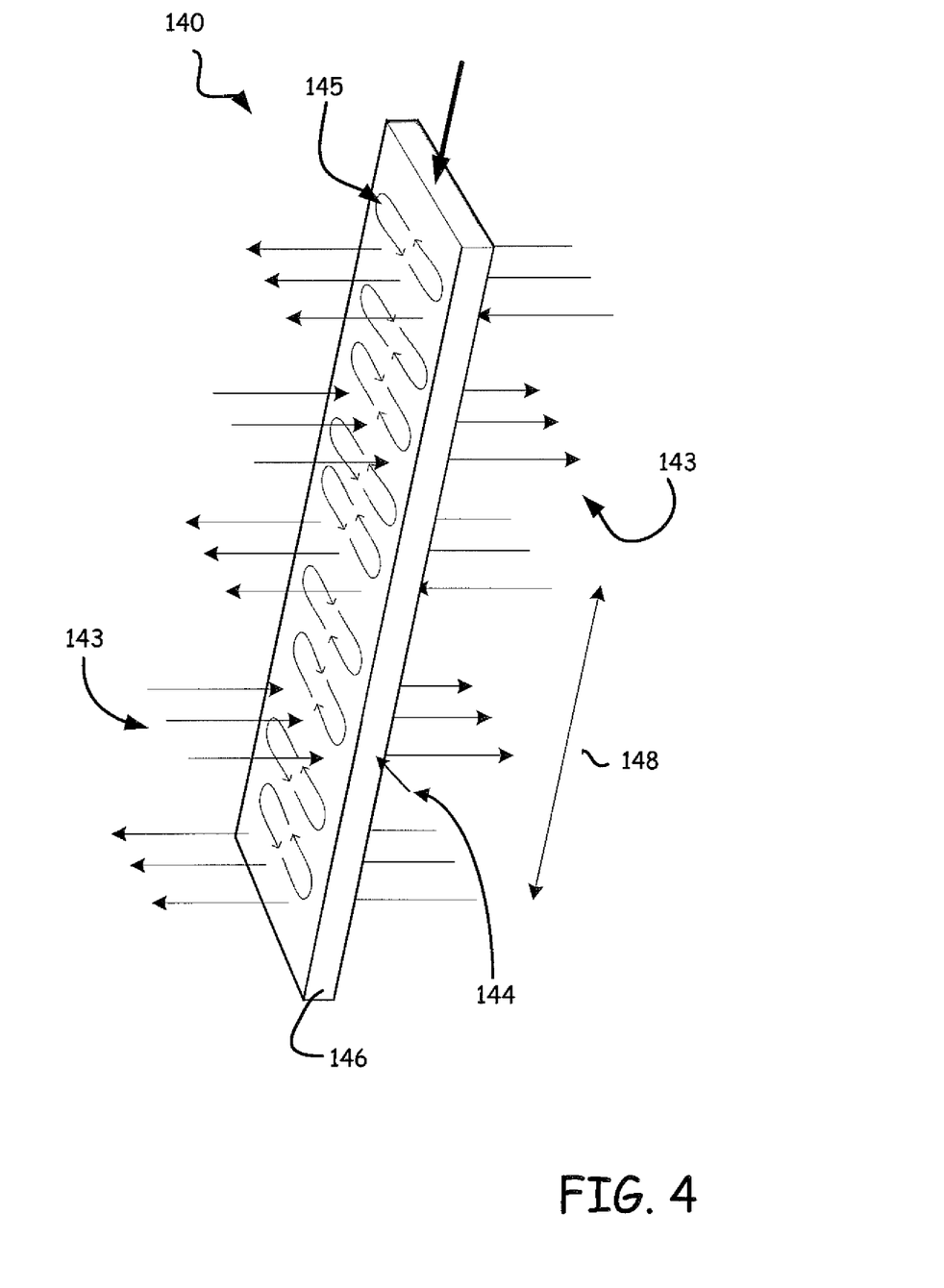
FIG. 4 is an expanded partial side view of a flow channel component of the extrusion line of the extrusion head for extruding a metal-based alloy.

Referring also to FIG. 4, the magnetic field produced by magnets 142 along with the flow of the heated metal-based alloy induces eddy currents within the heated metal-based alloy. The induced current represented by arrows 145 induces a second magnetic field which opposes the direction of the supplied magnetic field(s) 143. Thus, relative motion between the magnetic field and the flowing heated metal-based alloy induce eddy currents 145 that in turn create a magnetic field resistive to the direction of flow of the heated metal-based alloy. This resistive force acts as a back pressure which effectively induces a viscosity in the metal-based alloy and allows for flow control including braking and pumping of the flow of the heated metal-based alloy through channel 140 by manipulation of current through the channel 140.

Electrodes 144 positioned in channel 140 are configured to pass current through flow channel 140 and into the heated metal-based alloy, inducing eddy currents 145 within the alloy. As illustrated in FIG. 4, circular currents are generated along the length of channel 140 in the heated metal-based alloy flowing therethrough. Channel 140 and the heated metal-based alloy act as a conductor where the flow of heated metal-based alloy acts as a moving conductor. The induced eddy currents generate second magnetic fields, the induced magnetic fields, which oppose the supplied magnetic field(s) and react back on the moving conductor. The circular currents generate a magnetic field that creates a force resisting the metal-based alloy flow in the presence of the magnetic field 143. Referring to the embodiment illustrated in FIGS. 4-5, five magnet and yoke assemblies may be positioned along the length of channel 140 in order to produce the magnetic fields and electric fields illustrated in FIG. 4.

Figure 5:
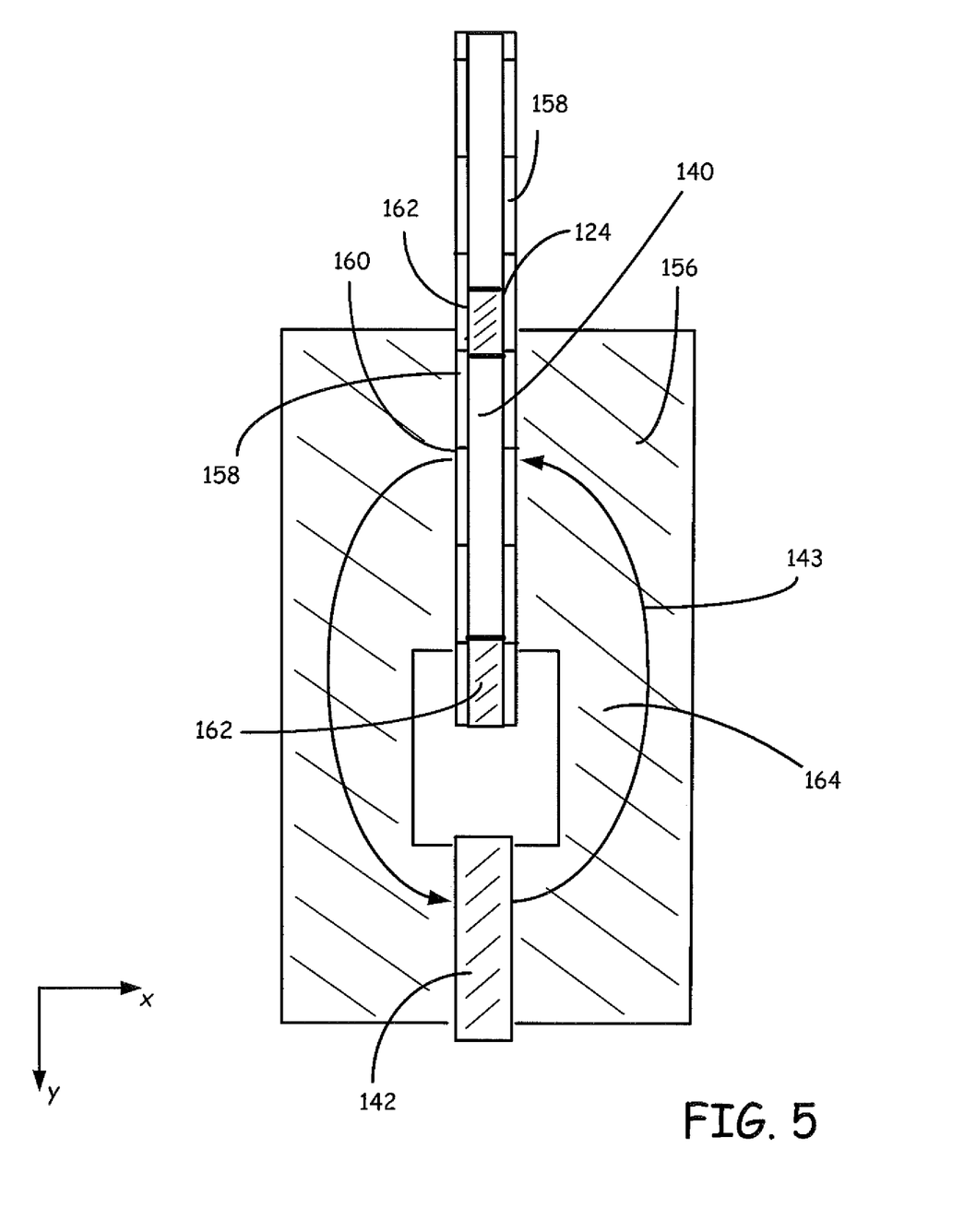
FIG. 5 is an expanded partial top sectional view of an extrusion line and flow channel component for extruding a metal-based alloy.

FIG. 5 is an expanded top cross-sectional view of an embodiment of channel 140. Flow channel 140 may be positioned in liquefier block 138 and surrounded by a softened metal, for example, soft iron 156. Incorporating a softened metal into liquefier block for surrounding channel 140 allows the field lines from permanent magnets 142 to be directed perpendicularly through heating elements 158 of liquefier tube 136 and thus perpendicularly through flow channel 140. The soft iron 156 also reinforces channel 140 to counter act pressure buildup in channel 140 due to the magnetic and electrical fields increasing the pressure on the heated metal-based alloy, preventing bowing of channel 140.

In one embodiment, heating elements 158 and a temperature sensor element 160 may be positioned in the liquefier block 138 allowing for maintenance of the elevated temperature of the heated metal-based alloy while monitoring the temperature of the heat resistant components of the liquefier assembly. Heating elements 158 may comprise thick film heaters or HEATRON® plates, which surround liquefier tube 136 and a high temperature stability fitting or gasket 162. Gasket 162 is configured to maintain a seal in the system 10 where elevated temperatures are continuously maintained for heating the metal-based alloy. In the illustrated embodiment, a gasket able to maintain a seal at continuous temperatures as high as 1000° C. is used. Magnets 142 also may comprise a magnet and yoke assembly, where the magnetic material, without windings, permanently connects two or more magnet cores.

A spacer 164 is positioned in one embodiment between each magnet 142 and the liquefier tube 136. This spacer, combined with the soft metal portions 156, allow the direction of the magnetic field lines to be oriented normal to the metal-based alloy flow direction.

The viscosity induced in the heated metal-based alloy can be estimated based on various system arrangements. In the embodiment illustrated in FIGS. 4-5, magnetic field 143 is produced and directed through thickness 146 of channel 140 by the array of permanent magnets 142 arranged with alternating poles extending along the length 148 of channel 140 as shown in FIG. 3. For the annular flow channel 140, the temperature independent magnetic field strength $\overline{B}(y)$ may be determined pursuant to Equation 1:

$$\overline{B}(y) = B_o \sin(k\ y)\hat{y}$$

where the length of each one of the loops may be determined pursuant to Equation 2:

$$L_{loop} = 2w + \pi/k$$

An alloy flow with velocity v will generate eddy current loops in the direction of arrows 145 where the electromotive force (emf) around one of the loops may be determined pursuant to Equations 3 and 4:

$$\mathrm{emf} = \frac{d}{dt}\overline{B}(y)\cdot\overline{A};\text{ and}$$

$$\mathrm{emf} \cong B_o w v \frac{\pi}{4}$$

Where the conductivity ρ of the alloy is taken, for example, to be approximately 2.5×10$^7$ mho/m and the current loop length is as determined by Equation 2, a current $I_{loop}$ for each of the N number of loops is shown in Equation 5:

$$I_{loop} = \frac{B_o w v \pi^2 h \rho}{\pi + 2wk}$$

where the force $F_{loop}$ on the alloy resisting the velocity v may be determined pursuant to Equation 6:

$$F_{loop} = I_{loop} w B_o$$

and the pressure $P_B$ resisting the flow produced by all N loops may be determined pursuant to Equation 7:

$$P_B = \frac{B_o^2 w v \pi^2 \rho N}{\pi + 2wk}.$$

Taking the length L of the channel to be N π/2 k, the pressure $P_B$ may be determined pursuant to Equation 8:

$$P_B = \frac{2B_o^2 w v \pi \rho k}{\pi + 2wk} Lv$$

The pressure drop Pη generated by the same channel produced by an average velocity v and a viscosity η may be determined pursuant to Equation 9:

$$P_\eta = \frac{12\eta}{h^2} Lv$$

The braking pressure in each of Equations 8 and 9 is proportional to the alloy velocity v and to the channel length L. The magnetic viscosity $\eta_B$ induced by eddy currents may be determined pursuant to Equation 10:

$$\eta_B = \frac{B_o^2 h^2 w v \pi \rho k}{6(\pi + 2wk)}$$

In a case in which a spacing of the field sign changes is set to k=π/w, the magnetic viscosity $\eta_B$ induced may be determined pursuant to Equation 11:

$$\eta_B = \frac{B_o^2 h^2 \pi \rho}{18}$$

As shown in Equations 10 and 11, increasing the and increasing the magnetic field correspondingly increases the magnetically induced viscosity of the heated metal-based alloy with the square of the gap and the square of the magnetic field, thereby increasing the controllability of the metal-based alloy flow through extrusion line 112. Additionally, as shown in the Equations above, metals and metal-based alloys having a higher conductivity illustrate ability for greater increase in magnetically induced viscosity.

The magnetically throttled liquefier 120 allows the flow rate of heated metal-based alloy through extrusion line 112 to be controlled by the controller 13 by manipulating the magnetic field and/or manipulating the current created in by the current source. The flow control is independent of the temperature of the heated metal-based alloy and independently of the heat capacity of the material directly under extrusion tip 122, as these parameters can vary widely depending on various features of additive manufacturing system 10. In some embodiments, adjusting the extrusion tip temperature and the draw (e.g. gap or spacing between the extrusion tip and the 3D part or last deposited layer) can allow for control of the heated metal-based alloy flow for start-up and shut-off of extrusion, allowing for starting up and shutting off of roads in the process of building the 3D part. Controlling the extrusion of the heated metal-based alloy during deposition may be accomplished by manipulating one or both of the electric field and magnetic field around the heated metal-based alloy and an electric current directed through the heated metal-based alloy in the flow channel.

The present disclosure uses the concept that a viscosity of a heated metal-based alloy, or liquidus portion of the heated metal-based alloy, can be adjusted, providing the heated metal-based alloy with a viscosity suitable for extruding the metal-based alloy to build a 3D object. The heated metal-based alloy may include a combination of liquidus metal-based alloy and heated metal-based alloy heated to an elevated temperature between a solidus state of the metal-based alloy and a liquidus state of the metal-based alloy. The viscosity of the heated metal-based alloy may be further controlled by altering the strength of the magnetic field and the flow rate of the heated metal based alloy may be controlled by adjusting the current applied to the heated metal-based alloy in the flow channel. Accordingly, the metal-based alloy may be heated in liquefier block 138 to at least a partially liquidus state and a viscosity induced such that the heated metal-based alloy is suitable for extrusion from extrusion tip 122. Examples of suitable viscosities for extruding the metal-based alloys range from about 1 poise to about 1,000 poise, with particularly suitable viscosities ranging from about 5 poise to about 500 poise, and with even more particularly suitable viscosities ranging from about 10 poise to about 100 poise.

Accordingly, suitable metal-based alloys for use with system 10 include any alloy containing two or more metal elements and that exhibits at least some electrical conductivity in a liquidus state. Examples of suitable metal-based alloys include aluminum based alloys, which have high electrical conductivity, for example aluminum alloys including about 90% by weight to about 95% by weight aluminum. Such alloys exhibit relatively low liquidus temperatures, and have sufficient conductivity for viscosity control.

While specific alloys have been discussed, it should be understood that additional metals and alloys thereof may be employed in the various embodiments without departing from the scope of the disclosure. For example, magnetic throttling may also be performed using, for example only and not by way of limitations, silver, copper, gold, rhodium, indium, ruthenium, osmium, palladium, and platinum, lead, tin and any combinations thereof.

EXAMPLES

The present disclosure is more particularly described in the following example that is intended as an illustration only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A heated metal-based alloy having a viscosity (η) of 0.5 centipoise will be directed through a channel having a length of approximately two (2) inches, a width of approximately 0.25 inches, and thickness of approximately 0.04 inches at a velocity (v) of 10 inches per second. Along the length of the channel there are seven alternating poles (magnets) per inch and nine current loops along the length of the channel. Taking Q=1000 mic/s and the initial magnetic field ($B_O$) at 1 Tesla, the pressure drop from the viscosity of the alloy is determined to be $P''$=0.011 psi, and the pressure drop from the current drag is determined to be 77.8 psi. The magnetic field determined above results in a magnetically induced viscosity of the heated metal-based alloy of approximately 45 poise, or 7,000 times the normal viscosity of the heated metal-based alloy.

Although the present disclosure has been described with reference to preferred embodiments, workers skilled in the art will recognize that changes may be made in form and detail without departing from the spirit and scope of the invention.

What is claimed:

1. A method for building a three-dimensional object in a layer-by-layer manner with an additive manufacturing system comprising:
   heating a build chamber of the additive manufacturing system to a selected elevated temperature;
   heating a metal feedstock in an extrusion line of the additive manufacturing system, wherein the metal feedstock is heated to an elevated temperature such that the metal feedstock is melted into a flowable state, wherein the extrusion line comprises a flow channel;
   generating a first magnetic field along a portion of a length of the extrusion line, the magnetic field lines being perpendicular to a flow direction of the extrusion line in a first direction;
   generating a second magnetic field along a portion of a length of the extrusion line, the magnetic field lines being perpendicular to a flow direction of the extrusion line in a second direction opposite the first direction;
   passing a current through the heated metal feedstock flowing through the flow channel;
   flowing the heated metal feedstock through the flow channel positioned within the first and second magnetic fields such that eddy currents are generated in the flowable metal feedstock that create resistive forces to the first and second magnetic fields to create backpressure that induces an increased viscosity in the flowable metal feedstock;
   controlling the flow rate of the heated metal feedstock through the flow channel for extrusion based on the relationship of the strength of the first and second magnetic fields and the electrical current passed to the heated metal feedstock;
   extruding the magnetically throttled heated metal feedstock from a deposition head of the additive manufacturing system onto a build platform of the additive manufacturing system or previously printed layers in a predetermined pattern to form the layers of the three-dimensional object; and
   solidifying the heated metal to provide a re-solidified metal layer of the three-dimensional object.

2. The method of claim 1, wherein the extrusion line is disposed outside of the build chamber and the deposition head is disposed within the build chamber, and wherein the method further comprises driving the heated metal from the extrusion line to the deposition head through the magnetic field to induce a viscosity in the heated metal feedstock.

3. The method of claim 1, wherein the metal feedstock comprises an aluminum based alloy.

4. The method of claim 3, wherein the metal feedstock comprises an aluminum based alloy comprising about 90% by weight to 95% by weight aluminum.

5. The method of claim 1 and further comprising passing the electrical current to the heated metal feedstock flowing through the flow channel with at least one electrode positioned within the channel.

6. A method for building a metal part in a layer-by-layer manner with an additive manufacturing system comprising:
   heating a build chamber of the additive manufacturing system to a selected elevated temperature;
   heating a metal feedstock in an extrusion line of the additive manufacturing system, wherein the metal feedstock is heated to an elevated temperature such that the metal-based alloy is melted into a flowable state;
   generating a plurality of alternating magnetic fields along a portion of a length of the extrusion line having a flow channel, the magnetic field lines being perpendicular to a flow direction of the extrusion line;
   generating and passing a current through the extrusion line and the flowable metal feedstock in a direction that is substantially perpendicular to the flow direction and substantially perpendicular to the direction of the magnetic field lines;
   flowing the heated metal feedstock through the flow channel positioned within the magnetic field and the electric current such that eddy currents are generated in the flowable metal feedstock that create resistive forces to the plurality of alternating magnetic fields to create backpressure that induces an increased viscosity in the flowable metal feedstock;
   controlling the flow rate of the heated metal feedstock through the flow channel for extrusion based on the relationship of the strength of the plurality of alternating magnetic fields and the electrical current passed to the heated metal feedstock;
   depositing the magnetically throttled heated metal feedstock from a deposition head of the additive manufacturing system onto a build platform of the additive manufacturing system or previously deposited layers in a predetermined pattern to form the layers of the metal part; and
   solidifying the deposited metal to provide a re-solidified metal in the layer being formed.

7. The method of claim 6, wherein the extrusion line is disposed outside of the build chamber and the deposition head is disposed within the build chamber, and wherein the method further comprises driving the heated metal feedstock from the extrusion line to the deposition head through the magnetic field and the electric current to induce a viscosity in the heated metal feedstock.

8. The method of claim 6, wherein the metal feedstock comprises an aluminum based alloy.

9. The method of claim 6, wherein the metal feedstock comprises an aluminum based alloy comprising about 90% by weight to 95% by weight aluminum.

10. The method of claim 6 and further comprising passing the electrical current to the heated metal feedstock flowing through the flow channel with at least one electrode positioned within the channel.

11. The method of claim 6 and further comprising passing the electrical current to the heated metal feedstock flowing through the flow channel with a plurality of electrodes positioned on opposing sides of the flow channel and external to the flow channel.

12. A method for building a metal part in a layer-by-layer manner with an additive manufacturing system comprising:

heating a build chamber of the additive manufacturing system to a selected elevated temperature;

heating a metal feedstock in an extrusion line of the additive manufacturing system, wherein the metal feedstock is heated to an elevated temperature such that the metal feedstock is melted into a flowable state;

generating a plurality of alternating magnetic field along a portion of a length of the extrusion line, the magnetic field lines being perpendicular to a flow direction of the extrusion line, wherein the extrusion line comprises a flow channel;

generating and passing an electric current through the extrusion line and the flowable metal feedstock in a direction that is substantially perpendicular to the flow direction and substantially perpendicular to the direction of the magnetic field lines;

flowing the heated metal feedstock through the flow channel positioned within the magnetic field and the electric current such that eddy currents are generated in the flowable metal feedstock that create resistive forces to the plurality of alternating magnetic fields to create backpressure that induces an increased viscosity in the flowable metal feedstock;

controlling the flow rate of the heated metal feedstock through the flow channel for extrusion based on the relationship of the strength of the plurality of alternating magnetic fields and the electrical current passed to the heated metal feedstock;

depositing the magnetically throttled heated metal feedstock from a deposition head of the additive manufacturing system onto a build platform of the additive manufacturing system or previously deposited layers in a predetermined pattern to form the layer; and solidifying the deposited metal to provide a re-solidified metal layer.

13. The method of claim 12, wherein the extrusion line is disposed outside of the build chamber and the deposition head is disposed within the build chamber, and wherein the method further comprises driving the heated metal feedstock from the extrusion line to the deposition head through the magnetic field and the electric current to induce a viscosity in the heated metal feedstock.

14. The method of claim 12, wherein the metal feedstock comprises an aluminum based alloy.

15. The method of claim 12, wherein the metal feedstock comprises an aluminum based alloy comprising about 90% by weight to 95% by weight aluminum.

16. The method of claim 12 and further comprising passing the electrical current to the heated metal feedstock flowing through the flow channel with at least one electrode positioned within the channel.

17. The method of claim 12 and further comprising passing the electrical current to the heated metal feedstock flowing through the flow channel with a plurality of electrodes positioned on opposing sides of the flow channel and external to the flow channel.

\* \* \* \* \*